(12) United States Patent
Ramachandran et al.

(10) Patent No.: US 11,755,418 B2
(45) Date of Patent: *Sep. 12, 2023

(54) EMULATING HIGH-FREQUENCY APPLICATION-CONSISTENT SNAPSHOTS BY FORMING RESTORE POINT DATA SETS BASED ON REMOTE SITE REPLAY OF I/O COMMANDS

(71) Applicant: Nutanix, Inc., San Jose, CA (US)

(72) Inventors: Parthasarathy Ramachandran, Palo Alto, CA (US); Bharat Kumar Beedu, Bangalore (IN); Karthik Chandrasekaran, Bangalore (IN); Balaji Janakiram, Pune (IN); Monoreet Mutsuddi, San Jose, CA (US); Vanita Prabhu, Bengaluru (IN); Mayur Vijay Sadavarte, Sunnyvale, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,824

(22) Filed: Aug. 16, 2021

(65) Prior Publication Data
US 2021/0374010 A1 Dec. 2, 2021

Related U.S. Application Data

(63) Continuation of application No. 16/201,826, filed on Nov. 27, 2018, now Pat. No. 11,093,338.
(Continued)

(51) Int. Cl.
*G06F 11/00* (2006.01)
*G06F 11/14* (2006.01)
(Continued)

(52) U.S. Cl.
CPC ...... *G06F 11/1451* (2013.01); *G06F 11/1407* (2013.01); *G06F 8/61* (2013.01);
(Continued)

(58) Field of Classification Search
CPC ............. G06F 11/1451; G06F 11/1407; G06F 2201/82
See application file for complete search history.

(56) References Cited

U.S. PATENT DOCUMENTS 5,592,618 A 1/1997 Micka et al.
6,493,796 B1 12/2002 Arnon et al.
(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Philip Guyton
(74) *Attorney, Agent, or Firm* — Vista IP Law Group, LLP

(57) ABSTRACT

The disclosed systems emulate high-frequency application-consistent snapshots by forming restore point data sets based on remote site replay of I/O commands. A method embodiment commences upon identifying a primary computing site and a secondary computing site, then identifying an application to be restored from the secondary computing site after a disaster. Prior to the disaster, a group of computing entities of the application to be restored from the secondary computing site are identified. Input/output operations that are performed over any of the computing entities at the primary site are streamed to the secondary site where they are stored. An I/O map that associates a time with an indication of a last received I/O command that had been performed over a changing set of computing entities is sent to the secondary
(Continued)

site. An agent at the secondary site accesses the I/O map and the streamed-over I/Os to construct recovery data.

24 Claims, 14 Drawing Sheets

Related U.S. Application Data

(60) Provisional application No. 62/591,110, filed on Nov. 27, 2017, provisional application No. 62/591,123, filed on Nov. 27, 2017.

(51) Int. Cl.
G06F 8/61 (2018.01)
G06F 9/455 (2018.01)

(52) U.S. Cl.
CPC .............. G06F 9/45558 (2013.01); G06F 2009/45579 (2013.01); G06F 2201/82 (2013.01); G06F 2201/84 (2013.01)

(56) References Cited

U.S. PATENT DOCUMENTS

| | | | |
|---|---|---|---|
| 7,136,974 B2 | 11/2006 | Burton et al. | |
| 7,346,805 B1 | 3/2008 | Scharland et al. | |
| 7,467,266 B2 | 12/2008 | Burton et al. | |
| 7,515,287 B2 | 4/2009 | Kitada | |
| 7,519,628 B1 | 4/2009 | Leverett et al. | |
| 7,574,418 B1 | 8/2009 | Patterson et al. | |
| 7,725,671 B2 | 5/2010 | Prahlad et al. | |
| 7,734,669 B2 | 6/2010 | Kottomtharayil et al. | |
| 7,765,187 B2 | 7/2010 | Bergant et al. | |
| 7,779,295 B1 | 8/2010 | Shah et al. | |
| 7,840,533 B2 | 11/2010 | Prahlad et al. | |
| 7,840,536 B1 | 11/2010 | Ahal et al. | |
| 8,140,772 B1 | 3/2012 | Yang | |
| 8,447,728 B2 | 5/2013 | Prahlad et al. | |
| 8,549,518 B1 | 10/2013 | Aron et al. | |
| 8,601,473 B1 | 12/2013 | Aron et al. | |
| 8,762,335 B2 | 6/2014 | Prahlad et al. | |
| 8,826,283 B2 | 9/2014 | Chen et al. | |
| 8,850,130 B1 | 9/2014 | Aron et al. | |
| 8,914,567 B2 | 12/2014 | Miroshnichenko et al. | |
| 9,069,704 B2 | 6/2015 | Schreter et al. | |
| 9,081,754 B1 | 7/2015 | Natanzon et al. | |
| 9,223,659 B1 | 12/2015 | Natanzon et al. | |
| 9,268,602 B2 | 2/2016 | Prahlad et al. | |
| 9,311,242 B1 | 4/2016 | Banerjee | |
| 9,405,481 B1 | 8/2016 | Cohen et al. | |
| 9,626,212 B2 | 4/2017 | Beveridge et al. | |
| 9,740,577 B1 | 8/2017 | Chakraborty et al. | |
| 9,740,723 B2 | 8/2017 | Prahlad et al. | |
| 9,772,866 B1 | 9/2017 | Aron et al. | |
| 9,946,569 B1 | 4/2018 | Beedu et al. | |
| 10,210,048 B2 | 2/2019 | Sancheti | |
| 10,248,657 B2 | 4/2019 | Prahlad et al. | |
| 10,255,137 B1 | 4/2019 | Panidis et al. | |
| 10,423,634 B1 | 9/2019 | Shemer et al. | |
| 10,437,783 B1 | 10/2019 | Cohen et al. | |
| 10,484,179 B1 | 11/2019 | Natanzon et al. | |
| 10,545,682 B1 | 1/2020 | Dalal et al. | |
| 10,649,861 B1 | 5/2020 | Natanzon et al. | |
| 11,093,338 B2 * | 8/2021 | Ramachandran ... | G06F 11/2023 |
| 2003/0051109 A1 | 3/2003 | Cochran | |
| 2003/0072263 A1 | 4/2003 | Peterson | |
| 2003/0191743 A1 | 10/2003 | Brodersen et al. | |
| 2006/0047926 A1 | 3/2006 | Zheng | |
| 2006/0053261 A1 | 3/2006 | Prahlad et al. | |
| 2006/0075281 A1 | 4/2006 | Kimmel et al. | |
| 2007/0185937 A1 | 8/2007 | Prahlad et al. | |
| 2010/0107158 A1 | 4/2010 | Chen et al. | |
| 2014/0115341 A1 | 4/2014 | Robertson | |
| 2014/0279892 A1 | 9/2014 | Bourbonnais et al. | |
| 2014/0317597 A1 | 10/2014 | Marks | |
| 2016/0210195 A1 | 7/2016 | Sinha | |
| 2016/0342334 A1 | 11/2016 | Elisha | |
| 2016/0359955 A1 | 12/2016 | Gill et al. | |
| 2017/0060449 A1 | 3/2017 | Zucca et al. | |
| 2017/0131905 A1 | 5/2017 | Agombar et al. | |
| 2017/0193012 A1 | 7/2017 | Gupta et al. | |
| 2017/0262520 A1 | 9/2017 | Mitkar et al. | |
| 2017/0315728 A1 * | 11/2017 | Zheng ................. | G06F 3/0604 |
| 2018/0121453 A1 | 5/2018 | Jain et al. | |
| 2018/0143880 A1 | 5/2018 | Dornemann | |
| 2018/0276084 A1 | 9/2018 | Mitkar et al. | |
| 2018/0285214 A1 | 10/2018 | Ashraf et al. | |
| 2019/0340075 A1 | 11/2019 | Ramachandran et al. | |
| 2020/0097376 A1 | 3/2020 | Zhao et al. | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Non-Final Office Action dated Feb. 21, 2020 for related U.S. Appl. No. 16/200,470.
Cano, I. et al., "Curator: Self-Managing Storage for Enterprise Clusters", 14th USENIX Symposium on Networked Systems Design and Implementation, NSDI '17, (Mar. 27, 2017).
International Search Report dated Feb. 14, 2019 for corresponding PCT Patent Application No. PCT/US18/62669.
International Preliminary Report dated Jan. 6, 2020 for corresponding PCT Patent Application No. PCT/US18/62669.
Non-Final Office Action dated Mar. 19, 2020 for related U.S. Appl. No. 16/200,502.
Microsoft, "Volume Shadow Copy Service", (Sep. 3, 2014), from https://docs.microsoft.com/en-us/previous-versions/windows/it-pro/windows-server-2008-R2-and-2008/ee923636(v=ws. 10).
VMWARE, "Using Storage vMotion to migrate a virtual machine with many disks timeout (1010045)", (Last Updated Feb. 19, 2014).
Non-Final Office Action dated Jun. 11, 2020 for related U.S. Appl. No. 16/201,258.
Non-Final Office Action dated Aug. 6, 2020 for related U.S. Appl. No. 16/200,482.
Arrieta-Salinas, l., et al., "Classic Replication Techniques on the Cloud", ARES 2012, Prague, Czech Republic, Aug. 20-24, 2012, pp. 268-273.
Yoon, H., et al., "Attribute-Based Partial Gee-Replication System", IC2E 2016, Berlin, Germany, Apr. 4-6, 2016, pp. 127-130.
Non-Final Office Action dated Aug. 11, 2020 for U.S. Appl. No. 16/201,826.

(56) References Cited

OTHER PUBLICATIONS

Final Office Action dated Sep. 10, 2020 for related U.S. Appl. No. 16/200,470.
Final Office Action dated Sep. 29, 2020 for related U.S. Appl. No. 16/200,502.
Notice of Allowance dated Nov. 4, 2020 for related U.S. Appl. No. 16/201,258.
Non-Final Office Action dated Jan. 6, 2021 for related U.S. Appl. No. 16/200,470.
Final Office Action dated Jan. 11, 2021 for U.S. Appl. No. 16/201,826.
Advisory Action dated Mar. 19, 2021 for U.S. Appl. No. 16/201,826.
Notice of Allowance dated Apr. 15, 2021 for U.S. Appl. No. 16/201,826.
Non-Final Office Action dated Jan. 26, 2021 for related U.S. Appl. No. 16/200,502.
Final Office Action dated Feb. 16, 2021 for related U.S. Appl. No. 16/200,482.
Advisory Action dated Apr. 26, 2021 for U.S. Appl. No. 16/200,482.
Notice of Allowance dated Jun. 16, 2021 for U.S. Appl. No. 16/200,482.
Kernighan, Brian W., et al., The C Programming Language, Prentice-Hall Software Series, Prentice-Hall, Inc., Englewood Cliffs, NJ © 1978, pp. 3-4, 11-12, 16-17, 51, 56-60 and 202.
Final Office Action dated Jul. 27, 2021 for related U.S. Appl. No. 16/200,470.
Notice of Allowance dated Sep. 30, 2021 for related U.S. Appl. No. 16/200,502.
Non-Final Office Action dated Nov. 3, 2021 for related U.S. Appl. No. 16/200,470.
Notice of Allowance for U.S. Appl. No. 16/200,470 dated May 13, 2022.
Poitras, Steven. "The Nutanix Bible" (Sep. 9, 2022), from https://nutanixbible.com/ (Publication date based on indicated capture date by Archive.org; first publication date unknown).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

\* cited by examiner

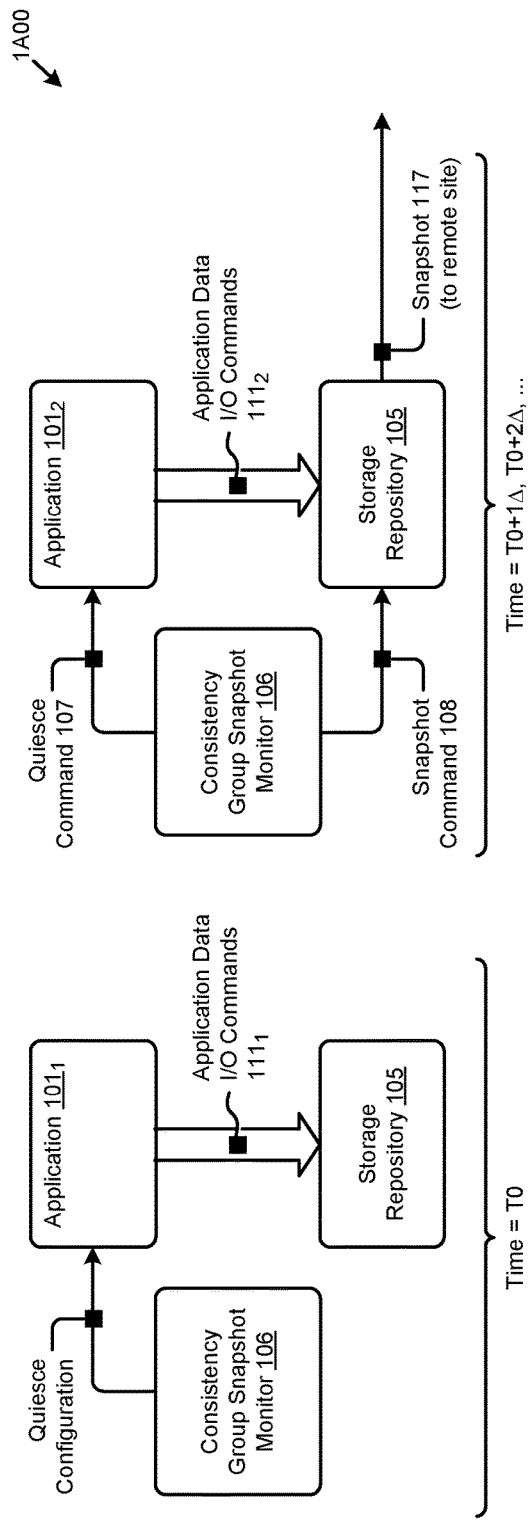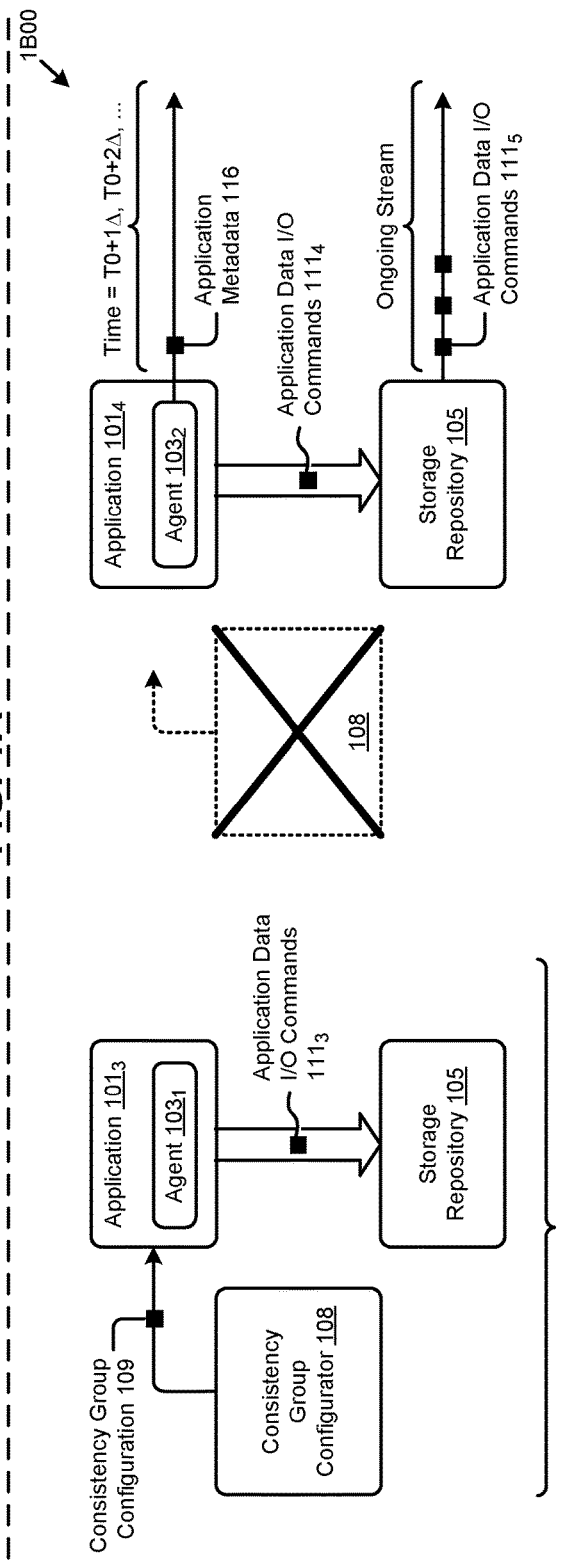
FIG. 1A
FIG. 1B

EMULATING HIGH-FREQUENCY APPLICATION-CONSISTENT SNAPSHOTS BY FORMING RESTORE POINT DATA SETS BASED ON REMOTE SITE REPLAY OF I/O COMMANDS

RELATED APPLICATIONS

The present application is a continuation of U.S. patent application Ser. No. 16/201,826 titled "EMULATING HIGH-FREQUENCY APPLICATION-CONSISTENT SNAPSHOTS BY FORMING RESTORE POINT DATA SETS BASED ON REMOTE SITE REPLAY OF I/O COMMANDS", filed on Nov. 27, 2018, and issue on Aug. 17, 2021 as U.S. Pat. No. 11,093,338, which claims the benefit of priority to U.S. Provisional Patent Application Ser. No. 62/591,110 titled "EMULATING HIGH-FREQUENCY DATA-CONSISTENT SNAPSHOTS BY FORMING RESTORE POINT DATA SETS BASED ON REMOTE SITE REPLAY OF I/O COMMANDS", filed on Nov. 27, 2017 and U.S. Provisional Patent Application Ser. No. 62/591,123 titled "EMULATING HIGH-FREQUENCY SNAPSHOTS BY FORMING RESTORE POINT DATA SETS BASED ON REMOTE SITE REPLAY OF I/O COMMANDS", filed on Nov. 27, 2017, which are hereby incorporated by reference in their entirety.

FIELD

This disclosure relates to computer data backup and restore, and more particularly to techniques for emulating high-frequency application-consistent snapshots by forming restore point data sets based on remote site replay of I/O commands.

BACKGROUND

Modern computing systems often host many clients (e.g., users) and many applications (e.g., email applications, database applications, etc.). For purposes of disaster recovery, snapshots of data from a primary site is sent to one or more remote sites, where the snapshots of data are stored for use in the event of a disaster at the primary site. As the amount and value of data increases over time, so does the need to capture as much of the "latest" data as possible. Accordingly, administrators of the computing systems that host users and their applications often increase the frequency at which snapshots are taken. For example, an administrator might initially establish (for example) a daily snapshot rate. However, if the daily snapshot rate is deemed too 'slow', in that too much data might be lost in a disaster situation, then the administrator might establish (for example) an hourly snapshot rate.

In order to perform snapshotting, applications need to be brought to some consistent state before forming the snapshot such that in the event of a restore (e.g., after a disaster), the application can be restored to a data-consistent state.

Administrators have long relied on techniques whereby an application to be snapshotted is signaled to "come down gracefully" so that a snapshot can be formed. This technique is disruptive to users. In more recent times, administrators have improved the signaling to the application to request that the application momentarily suspend normal operations and flush data (e.g., flush buffers, close files, process in-flight I/O (input/output or IO), etc.) just before a snapshot is taken. When the application has signaled back that it has successfully "quiesced", then a snapshot is taken and sent to the remote site for possible use in a recovery scenario.

Unfortunately, this process of signaling the application to quiesce, then waiting for the application to respond after quiescing, then taking the snapshot and sending to the remote site becomes more and more expensive and more and more onerous to users as the frequency of the desired snapshots increases. What is needed is a way to generate data-consistent restore sets without having to incur the costs involved with signaling to/from the application, then quiescing the application (e.g., to a data-consistent state), then snapshotting, then signaling to/from the application again, etc.

SUMMARY

The present disclosure describes techniques used in systems, methods, and in computer program products for emulating high-frequency application-consistent snapshots by forming restore point data sets based on remote site replay of streamed-over I/O commands. The formation of the restore point involves replay of certain streamed-over I/O commands that are selected using a data-consistent I/O map that relates streamed I/Os to respective times and groupings, which techniques advance the relevant technologies to address technological issues with legacy approaches. More specifically, the present disclosure describes techniques used in systems, methods, and in computer program products for disaster recovery of data-consistent groups of computing entities by replaying replicated I/O commands either on command (e.g., responsive to a disaster recover action) or as a background activity of the remote site. Certain embodiments are directed to technological solutions for maintaining a log file and a data-consistent I/O map that is used for I/O replay of the I/O commands of a data-consistent set of computing entities.

The disclosed embodiments modify and improve over legacy approaches. In particular, the herein-disclosed techniques provide technical solutions that address the technical problems attendant to generating data-consistent restore sets without having to incur the costs involved with signaling to/from the application, then quiescing the application (e.g., to a data-consistent state), then snapshotting, then signaling to/from the application again, and then sending the snapshot to a secondary site. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication by avoiding taking and sending snapshots to a secondary site at high frequencies. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of distributed storage systems as well as advances in various technical fields related to computing cluster management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 1A is a block diagram depicting a disaster recovery technique that relies on a snapshot monitor agent to manage primary site formation of application snapshots for storage at a secondary site.

FIG. 1B is a block diagram depicting a disaster recovery technique that replicates application I/O commands to a remote site for deferring snapshot generation until previously-received I/O commands are replayed at a remote site, according to some embodiments.

DETAILED DESCRIPTION

Figure 2A:
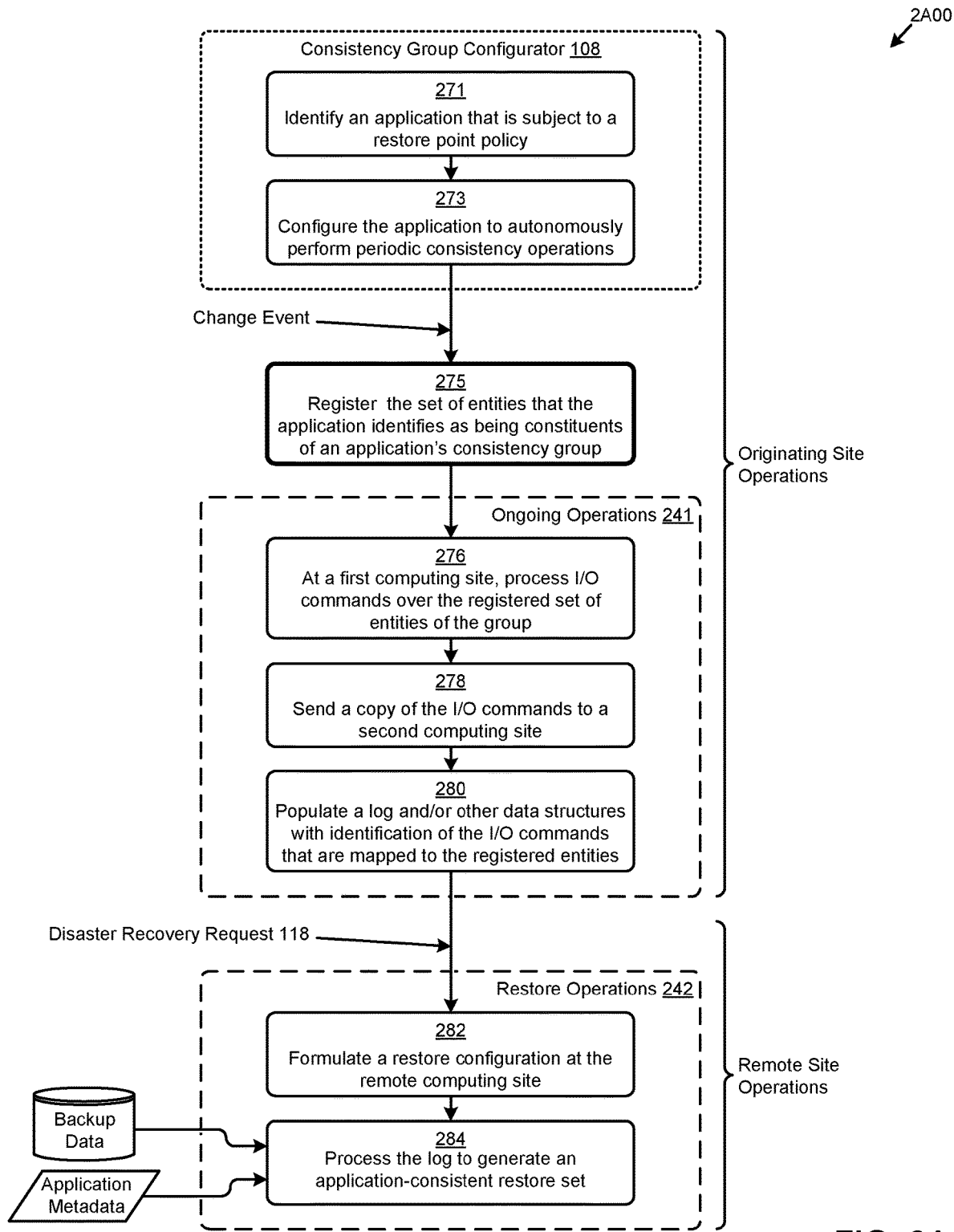
FIG. 2A is a block diagram that depicts a technique for streaming data-consistent I/O commands to a remote site for deferred formation of a snapshot at the remote site, according to an embodiment.

Embodiments in accordance with the present disclosure address the problem of generating data-consistent restore sets without having to incur the costs involved with signaling to/from the application, then quiescing the application (e.g., to a data-consistent state), then snapshotting the application, then signaling to/from the application again, and sending the snapshot to a secondary site. More particularly, rather than place reliance on an application to respond to periodic signals or requests to quiesce so that an application-consistent snapshot can be taken—thus incurring at least some momentary service interruption—the techniques disclosed herein do not rely on the application to be responsive to such signaling and suspension of services during snapshotting. Instead, using the techniques disclosed herein, an application can be configured by installing and initializing callbacks and/or by installing a plug-in, and/or by installing or invoking an agent. The callbacks and/or the plug-in, and/or the agent serves to report when an object/entity of the application (e.g., a file or virtual disk, etc.) is added or deleted. The application is then allowed to run unfettered by the impact of the aforementioned signaling, quiescing, etc. In fact, rather than quiesce the application in order to take a snapshot, the I/O commands performed over any of the objects or entities of the application are observed as the application runs, and such I/O commands are streamed to a secondary site where they are stored in a log. Using this technique, the application need not quiesce for the purpose of periodic formation of snapshots, thus users of the application do not need to endure periodic service outages. Use of this technique becomes more and more important as administrators specify more and more stringent requirements for restore points.

In the event of a disaster, a facility at the secondary site replays the streamed-over I/Os that pertain to any of the objects or entities of the application, thus forming a data-consistent restore point for the application. Since the secondary site has an accurate mapping of the objects or entities of the application, even in the event that objects or entities of the application had been added or deleted, the restore point is considered to be application-consistent.

Use of the approaches as disclosed herein use far fewer resources than approaches that form snapshots at the primary site.

Some embodiments and techniques are directed to approaches for maintaining a log file and a data-consistent I/O map that is used for I/O replay of the I/O commands of a data-consistent set of computing entities. The accompanying figures and discussions herein present example environments, systems, methods, and computer program products for disaster recovery of data-consistent groups of computing entities by replaying certain sets of the replicated I/O commands at the secondary site.

Overview

Disclosed herein are techniques for configuring an application to identify groups of entities involved in operation of the application. Once configured, any I/O over any of the entities of the group is observed and a copy is sent to a secondary site for later processing in the event of some disaster. Also, the constituency of the data-consistent group is sent to the secondary site. Upon a disaster recovery request, all of the I/O commands pertaining to all of the constituents of the data-consistent group are processed such that the recovered data is in a data-consistent state once recovered.

In some embodiments, the techniques for configuring the application such that the application itself identifies groups of entities involved in data-consistent operation of the application can involve plug-ins or other extensibility of the subject application such that the application is able to manage the constituency of the data-consistent group on an ongoing basis.

In some cases, the configuration of the application further involves instructing the application to form and communicate the constituency of the data-consistent group at a high frequency. The processing costs involved in forming and communicating changes to the constituency of a data-consistent group is many orders of magnitude less that the cost of forming and communicating a snapshot. As such, the application need only quiesce for a brief moment, rather than the much longer time needed to quiesce when forming and sending a snapshot to a remote site.

Some embodiments involve client-server applications (e.g., an email server, a database server, etc.). As such, disclosed herein are techniques that instruct the server-based application to collect all application data for all clients, such as all client status information including network configuration, all client preferences, all server configuration data, etc. into a group. Thereafter, all of the I/O commands over any entity of the data-consistent group is observed and logged such that all I/O commands for all of the entities of the data-consistent group can be replayed in the context of a disaster recovery scenario. The recovery set that results after replaying all I/O commands for all of the entities of the data-consistent group is thus data-consistent within itself.

Some embodiments rely in part on certain types of application extensibility. For example, both an EXCHANGE server and an SQL server support extensibility through the "volume shadow (copy) service" (VSS). In particular, an application that supports VSS can be instructed to return a set of all users/sessions that are currently open, as well as all user virtual disks that are currently open, plus all network I/O configurations that are currently in use, etc. This full listing of all entities that are managed for consistency by the application can be used to form a consistency group, which, in turn is used in recovery scenarios to be sure that all entities are restored to a data-consistent state. The aforementioned VSS extensibility and other extensibility facilities such as application hosting of a guest process and/or registering of callbacks facilitate application-specific, ongoing reporting of changes to the constituency of the data-consistent group. Any such changes in the constituency of the data-consistent group are sent to the secondary site for use in a recovery scenario.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A is a block diagram depicting a disaster recovery technique 1A00 that relies on a snapshot monitor agent to manage primary site formation of application snapshots for storage at a secondary site. As an option, one or more variations of disaster recovery technique 1A00 or any aspect thereof may be implemented in the context of the architecture and functionality of the embodiments described herein. The disaster recovery technique 1A00 or any aspect thereof may be implemented in any environment.

The embodiment shown in FIG. 1A is merely one example. As shown, at time=T0, an application $101_1$ is configured to respond to commands (e.g., quiesce commands) that are sent to the application at later times, such as when a snapshot is to be taken. As shown, the quiescence configuration is established by the shown consistency group snapshot monitor 106. As the application executes, it sends I/O commands (e.g., application data I/O commands $111_1$) to storage repository 105. At some moment in time (e.g., at time=T0+1Δ, T0+2Δ, etc.), the consistency group snapshot monitor sends a quiesce command 107 to application $101_2$. The application in turn responds to the quiesce command so as to temporarily suspend ongoing application processing, to flush buffers, to complete in-process transactions, etc. and/or to perform any other activities that are needed to ensure that all of the data of the application is in a consistent state. In the course of reaching a quiescent state, the application sends application data I/O commands $111_2$ to storage repository 105. Also, at some moment in time (e.g., a time=T0+1Δ, T0+2Δ, etc.), consistency group snapshot monitor 106 sends a snapshot command 108 to the storage repository. The storage repository then collects the data needed to form a snapshot 117, and then sends the snapshot to a remote site.

While the technique of FIG. 1A serves the purpose of forming an application-consistent snapshot, this technique necessarily includes steps for quiescing the application periodically. However, this technique (e.g., signaling to the application to quiesce, then waiting for the application to respond to the quiesce command, then taking a snapshot, and then sending to the remote site) becomes more and more expensive and more and more onerous to users as the frequency of the desired snapshots increases. The following FIG. 1B depicts an alternative technique for generating data-consistent restore sets without having to incur the aforementioned costs involved with signaling, quiescing, etc.

FIG. 1B is a block diagram depicting a disaster recovery technique 1B00 that replicates application I/O commands to a remote site for deferring snapshot generation until previously-received I/O commands are replayed at a remote site. As an option, one or more variations of disaster recovery technique 1B00 or any aspect thereof may be implemented in the context of the architecture and functionality of the embodiments described herein. The disaster recovery technique 1B00 or any aspect thereof may be implemented in any environment.

The embodiment shown in FIG. 1B is merely one example. As shown, the consistency group snapshot monitor is replaced by a consistency group configurator 108. At time=T0, rather than establishing a quiescence configuration within the application (e.g., as pertaining to the technique of FIG. 1A), a consistency group configurator 108 communicates with an agent $103_1$ within application $101_3$ to send a consistency group configuration 109. The consistency group configuration establishes the constituency of a consistency group that is thereafter used by the application. As the application operates, it sends application data I/O commands $111_3$ to the storage repository.

At some moment in time (e.g., a time=T0+1Δ, T0+2Δ, etc.), agent $103_2$ within application $101_4$ sends application metadata 116 to the remote site. Also, as the application operates at time=T>0, it sends application data I/O commands $111_4$ to the storage repository, which are in turn are streamed to the remote site (e.g., via the streaming application data I/O commands $111_5$). The application metadata 116 comprises sufficient information for a snapshot to be constructed at the remote site by replaying a particular set of application data I/O commands that had been streamed to the remote site. The specific types of information included in the stream of application data I/O commands and in the application metadata are shown and discussed as pertains to FIG. 2A.

FIG. 2A is a block diagram 2A00 that depicts a technique for streaming data-consistent I/O commands to a remote site for deferred formation of a snapshot at the remote site. As an option, one or more variations of technique for streaming data-consistent I/O commands to a remote site or any aspect thereof may be implemented in the context of the architecture and functionality of the embodiments described herein. The technique for streaming data-consistent I/O commands to a remote site or any aspect thereof may be implemented in any environment.

As shown, the flow of block diagram 2A00 includes steps that are performed by consistency group configurator 108. Specifically, and as shown, step 271 serves to identify an application that is to be subjected to a restore operation at some later time, such as after a disaster or other event that would precipitate a restore of the application. At step 273, the identified application is configured to autonomously perform certain periodic consistency-group operations, such as to monitor changes in the application's consistency group. Details of various techniques to configure an application for such certain periodic consistency-group operations are shown and described infra.

Once an application is configured to monitor changes in the application's consistency group, whenever there is a change in the application's consistency group (e.g., to add or delete a computing entity of the application), that change raises a change event at the originating site. As shown, a change event can occur at any moment in time (e.g., such when a virtual disk is created, such as when a file is opened, such as when an application configuration setting is changed, etc.). Upon and initial pass, or upon change event step 275 serves for registering the set of entities that comprise the application's consistency group. During execution of the application, the makeup of the application's consistency group may change, for example when a new vDisk is added to the application's consistency group. During ongoing monitoring of changes, when the makeup of an application's consistency group changes, the updated group of computing entities is registered/re-registered.

Strictly as one example, the registration might include registration with an agent, and/or the registration might include registration with one or more processes that perform the shown ongoing operations 241. As such, step 276 serves for processing I/O commands pertaining to the registered entities. Step 278 serves for sending a copy of I/O commands to a second computing site. When a copy of an I/O commands is sent to the second computing site, a copy of the I/O command is also stored in a log (step 280). In this embodiment, the population of the log and/or other data structures includes tagging or other identification of the I/O commands that correspond to the registered entities of the consistency group.

Upon occurrence of a disaster, or in the event there arises any reason or necessity to perform a restore, a disaster recovery request 118 might be issued so as to invoke restore operations 242 at the remote site. The remote site restore operations in turn processes the disaster recovery request to formulate (at step 282) a restore configuration (e.g., to restore certain consistency groups to a particular point in time). Any backup data and application metadata available to the remote site is retrieved, and the log is processed at step 284 so as to replay I/O commands pertaining to the consistency group over the retrieved backup data. Characteristics of the consistency group that have been sent to the remote site are used to determine the specific set of I/O commands to replay over the backup data so as to generate an application-consistent restore set.

Figure 2B:
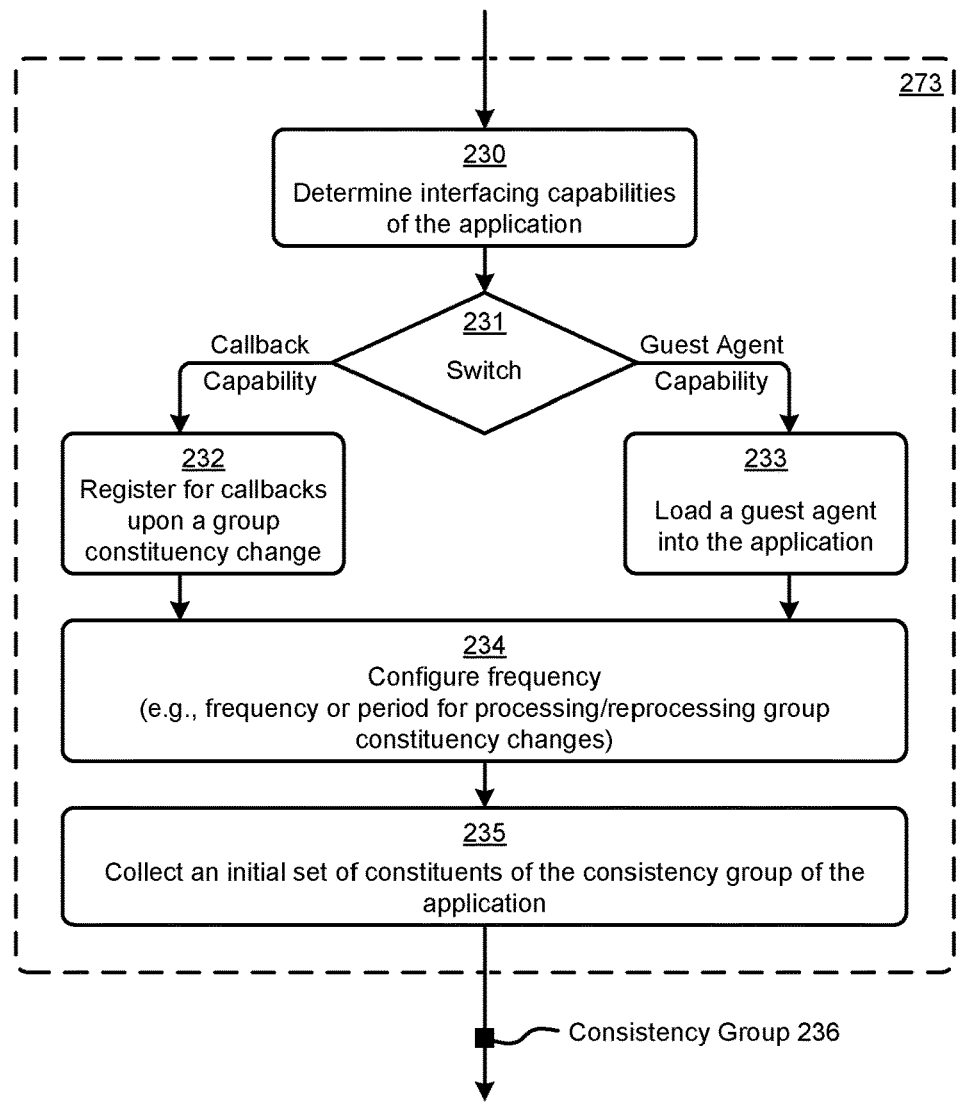
FIG. 2B is a block diagram that depicts an application extension technique used to instruct the application to report consistency group changes, according to some embodiments.

FIG. 2B is a block diagram that depicts an application extension technique 2B00 used to instruct the application to report consistency group changes. As an option, one or more variations of application extension technique 2B00 or any aspect thereof may be implemented in the context of the architecture and functionality of the embodiments described herein. The application extension technique 2B00 or any aspect thereof may be implemented in any environment.

The embodiment shown in FIG. 2B is merely one example flow for determining the constituency of an application consistency group (e.g., consistency group 236). As shown, step 230 determines a set of interfacing capabilities for the application under consideration. For example, an application such as SQL might support application programming interface callbacks that facilitate determination of the constituency of that application's consistency group. In another scenario, an application might support hosting of an agent within the application (e.g., within a virtual machine). Such possibilities for forming and maintaining a consistency group are merely examples. Any known techniques can be used, singly or in combination.

As shown, switch 231 takes one of multiple paths through the flow. If the application supports application programming interface (API) calls and/or callbacks, then step 232 serves for registering with the application so as to receive application configuration data that describes entities to be processed in accordance with the restore point policy. In the alternative (step 233), if the application supports a guest agent, then an agent can be installed into the application to carry out autonomous operations accordance with the restore point policy.

After determining interfacing capabilities and implementing a selected one or more interfacing techniques, step 234 serves to configure a frequency of autonomous actions taken as pertains to the constituency of the consistency group. An initial constituency of the consistency group 236 is gathered at step 235. The constituency of the consistency group is used to configure I/O monitoring and mapping. One technique to register a consistency group for I/O monitoring (e.g., streaming) and mapping (e.g., group constituency mapping) is given in the following FIG. 2C.

Figure 2C:
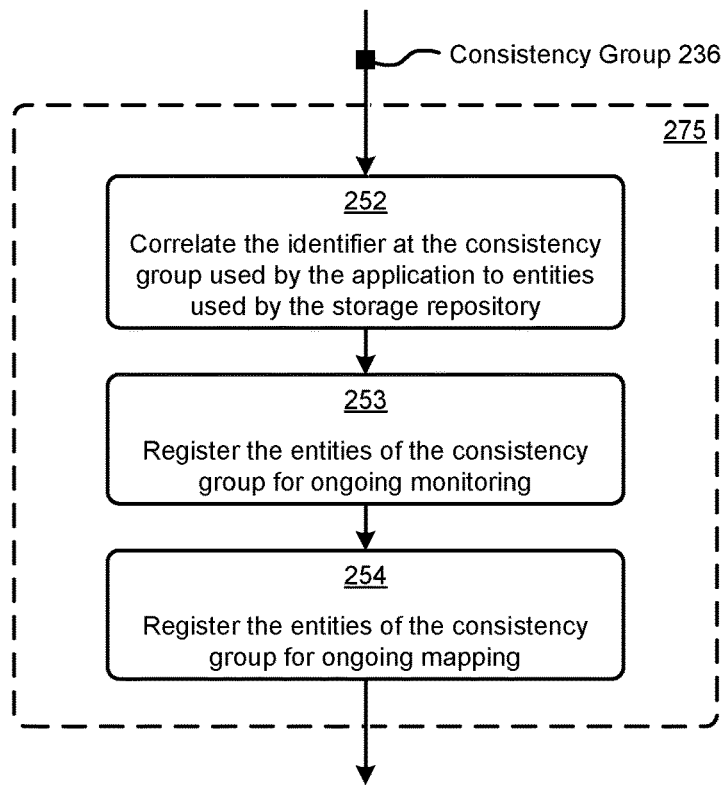
FIG. 2C is a block diagram that depicts a stream registration technique for processing I/O commands as a group for later formation of a data-consistent snapshot for the group, according to an embodiment.

FIG. 2C is a block diagram that depicts a stream registration technique 2C00 for processing I/O commands as a group for later formation of a data-consistent snapshot of the group. As an option, one or more variations of stream registration technique 2C00 or any aspect thereof may be implemented in the context of the architecture and functionality of the embodiments described herein. The stream registration technique 2C00 or any aspect thereof may be implemented in any environment.

The embodiment shown in FIG. 2C is merely one example. As shown, the flow includes a step to assign or otherwise correlate a group identifier with the entities that are included in the consistency group 236. In some cases, a storage repository has a capability to monitor I/Os over specified entities. In such cases, step 252 serves to register the entities with the storage repository. In other embodiments, step 253 serves to register the entities with the any service, sniffer, or agent that can monitor I/O activity that occurs over the identified entities.

Additionally, and as shown, step 254 serves to register the entities for ongoing mapping activities (e.g., activities pertaining to group constituency mapping). In some cases, the ongoing mapping activities results in formation of an I/O map that is used for forming a snapshot. Techniques and resulting data items pertaining to ongoing monitoring (e.g., as registered in step 253) and techniques and resulting data items pertaining to ongoing mapping (e.g., as registered in step 254) can be used in various disaster recovery scenarios. One such disaster recovery scenario is presently discussed.

Figure 2D:
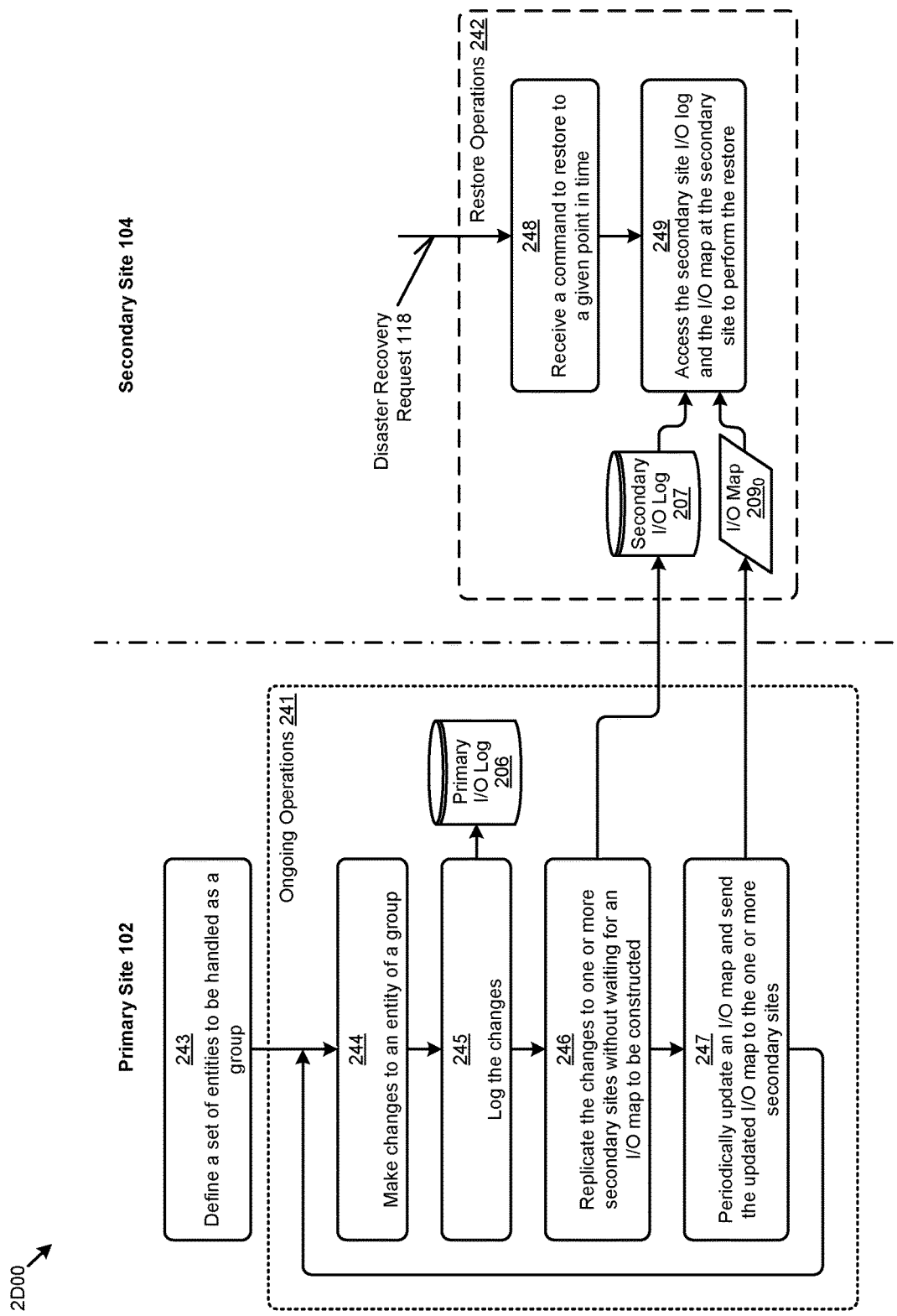
FIG. 2D is a block diagram that depicts a disaster recovery scenario that performs disaster recovery of data-consistent groups of computing entities by replaying replicated I/O commands, according to an embodiment.

FIG. 2D is a block diagram that depicts a disaster recovery scenario 2D00 that performs disaster recovery of data-consistent groups of computing entities by replaying replicated I/O commands. As an option, one or more variations of disaster recovery scenario 2D00 or any aspect thereof may be implemented in the context of the architecture and functionality of the embodiments described herein. The disaster recovery scenario 2D00 or any aspect thereof may be implemented in any environment.

The technique as used in the aforementioned disaster recovery scenario commences at primary site 102 by defining a set of entities to be handled as a group (step 243). In the context of the shown ongoing operations 241, various agents at the primary site make periodic changes to one or more of the entities of a group (step 244). For instance, and as shown, the system detects a change and logs the occurrence (step 245) of the I/O command that precipitated the change in the log shown as primary I/O log 206. The I/O command that precipitated the change is also replicated at the secondary site (step 246). The replicated change is sent to the secondary site without waiting for an I/O map to be constructed. However, periodically, an I/O map is updated and sent to a secondary site (step 247).

During processing of the ongoing operations 241 at the primary site, secondary site 104 cooperates by storing the replicated I/O command into the log shown as secondary site I/O log 207. Similarly, as the primary site forms and updates the I/O map, the contents of the I/O map are replicated at the secondary site in a location shown as I/O map 209$_0$.

When a disaster recovery request 118 is received at the secondary site, restore operations 242 are initiated. Specifically, step 248 serves to evaluate the disaster recovery request to determine the time boundary given in the disaster recovery request. In some cases, the disaster recovery request also comprises a specification of a group such that all of the constituent computing entities of the group will be restored to the same point in time. The restore operation continues at step 249, where a secondary site process accesses the secondary site I/O log 207 and the I/O map 209$_0$ to form a snapshot for the restore.

A variety of disaster recovery scenarios can be implemented using the foregoing techniques. One such disaster recovery scenario is shown and described as pertains to FIG. 2E.

Figure 2E:
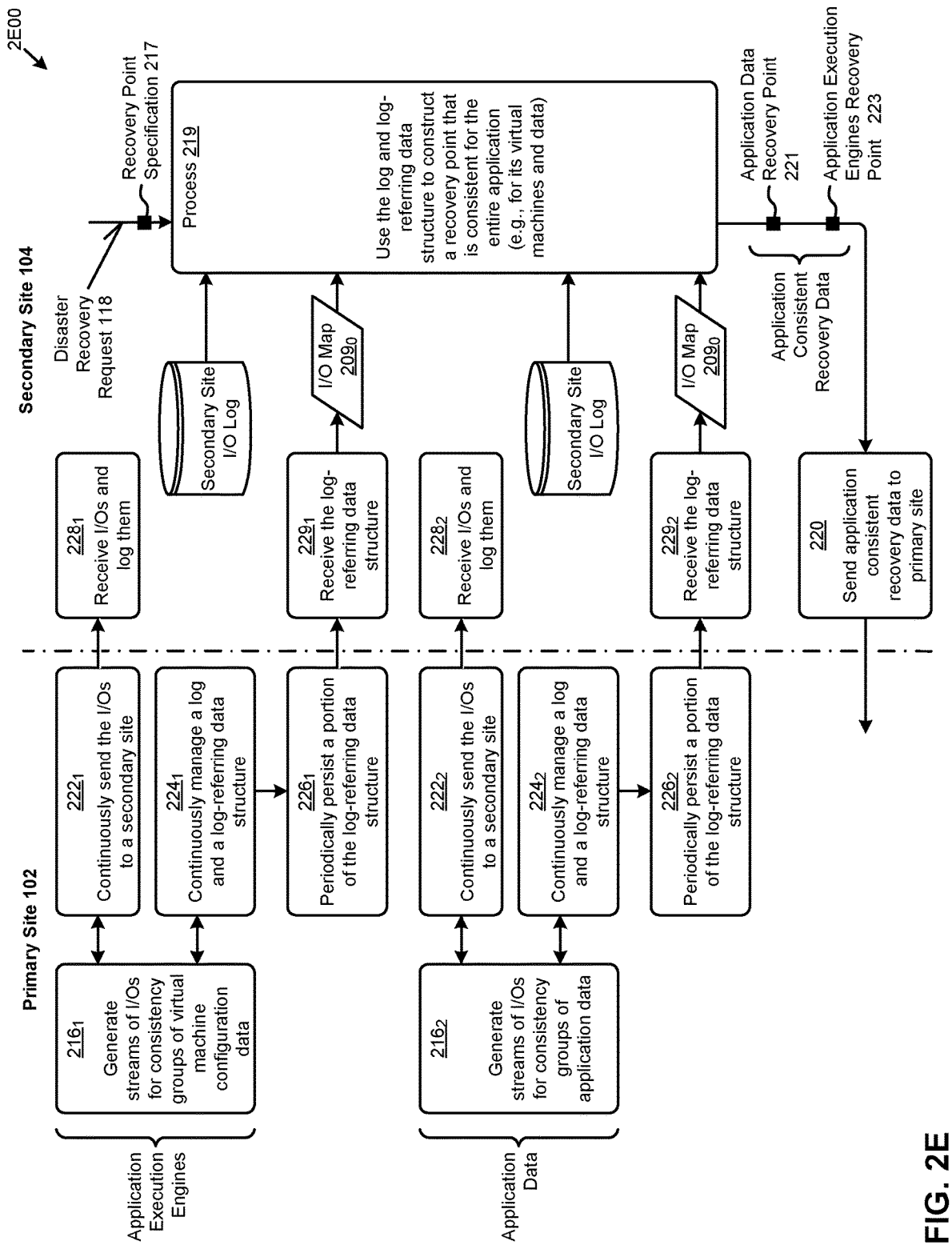
FIG. 2E is a block diagram that depicts a disaster recovery scenario that performs disaster recovery of groups of virtual machines and their respective application data by replaying replicated I/O commands, according to an embodiment.

FIG. 2E is a block diagram that depicts a disaster recovery scenario 2E00 that performs disaster recovery of groups of virtual machines and their respective application data by replaying replicated I/O commands. In this embodiment, at primary site 102, any number of application execution engines and/or their agents (e.g., virtual machines) generate streams of I/Os pertaining to configuration data (operation 216$_1$). Concurrently, operation 216$_2$ serves to generate streams of I/Os pertaining to application data. On an ongoing basis, the application execution engine or a corresponding agent sends I/Os pertaining to the configuration data to a secondary site (operation 222$_1$). Also on an ongoing basis, the application execution engine or a corresponding agent continuously manages an I/O log and a log-referring data structure (operation 224$_1$), which log-referring data structure is periodically persisted to the secondary site (operation 226$_1$) by transmitting all or portions of the log-referring data structure to the secondary site.

Application data is handled similarly. Specifically, operation 216$_2$ serves to generate streams of I/Os pertaining to application data. On an ongoing basis, an agent that can observe changes (e.g., I/O commands) to application data sends I/Os pertaining to the application data to a secondary site (operation 222$_2$). Also, on an ongoing basis, the aforementioned agent or a different agent continuously manages the I/O log and log-referring data structure (operation 224$_2$), which log-referring data structure is periodically persisted to the secondary site (operation 226$_2$).

The secondary site 104 is configured so as to receive I/O commands from the primary site (e.g., via operation 228$_1$ and operation 228$_2$). The secondary site is further configured so as to receive updated copies of the log-referring data structure from the primary site (e.g., via operation 229$_1$ and operation 229$_2$).

At some moment in time—for example, after a disaster or other event at the primary site—the secondary site receives a disaster recovery request 118, together with a recovery point specification 217. The recovery point specification includes an indication of a time or sequence boundary that in turn determines the time to which point an application-consistent recovery set is to be generated. The combination of the disaster recovery request and recovery point specification is sufficient to invoke one or more processes (e.g., process 219) at the secondary site that serve to perform operation 216$_1$. The disaster recovery request or similar signal can be transmitted from the primary site to the secondary site. In many cases the primary site forms the recovery point specification in accordance with administrative indications, and constructs a message that is used for transmitting a recovery point specification to the secondary site over an IP network.

Operation $216_1$ uses the earlier-persisted log-referring data structure and the secondary site I/O log to construct a recovery point that is consistent for the entire set of application execution engines (e.g., application execution engines recovery point 223). Concurrently, operation $216_2$ uses the earlier-persisted log-referring data structure and the secondary site I/O log to construct a recovery point that is consistent for the entire set of application data (e.g., application data recovery point 221). More specifically, the recovery point is constructed to comprise all of the data needed to be consistent for all of the virtual machine configuration data and consistent for all of the application data that has been grouped at the primary site. A process at the secondary site sends the collection of application consistent recovery data to the primary site (at operation 220).

Any of the foregoing operations can be implemented in any one or more nodes. One possible implementation of grouping and streaming is given as pertains to the FIG. 3.

Figure 3:
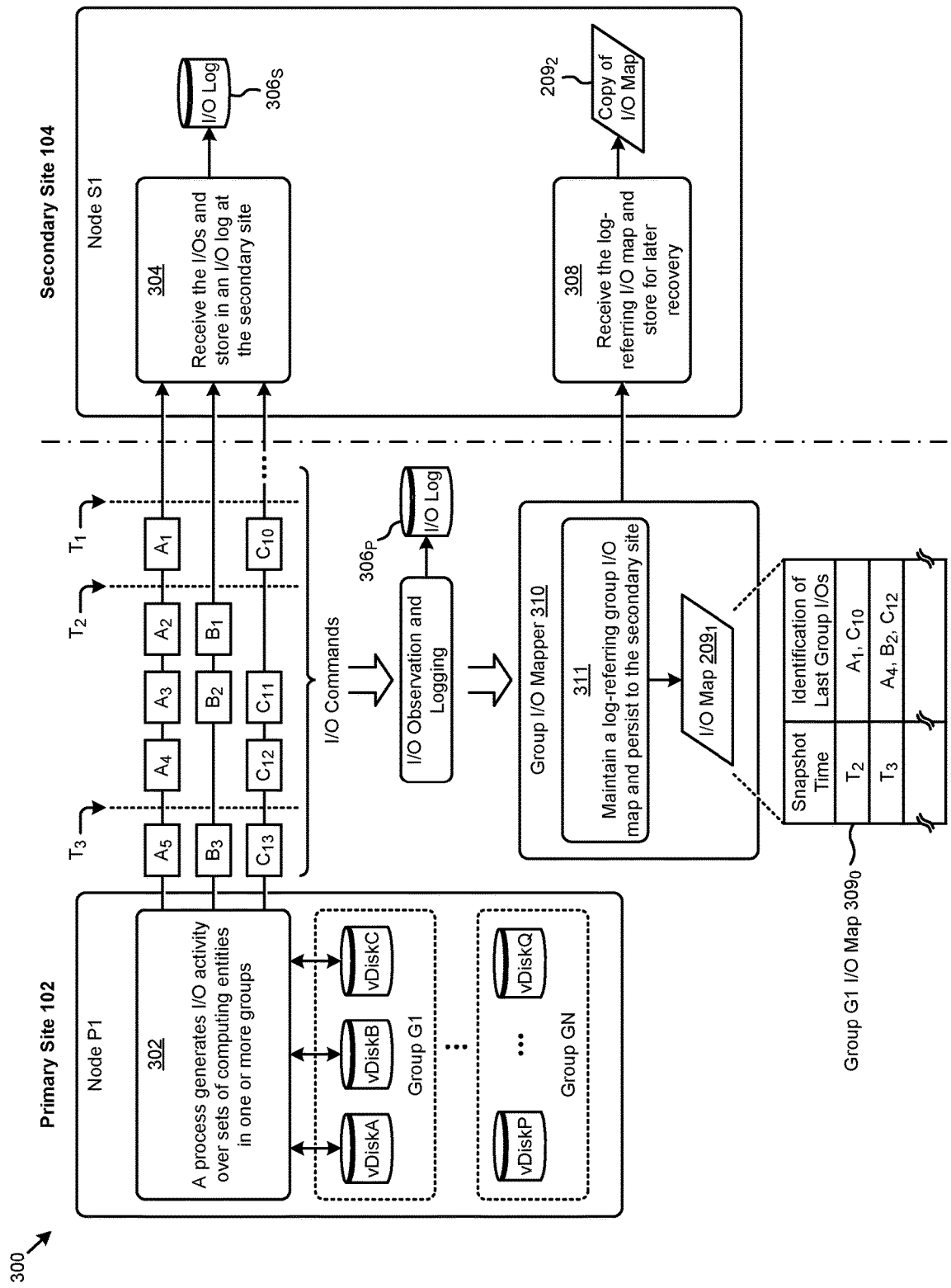
FIG. 3 depicts a multi-site environment in which steps for I/O command observation, I/O command logging, and I/O command mapping are combined to generate an I/O map that is used when forming a snapshot in response to a disaster recovery request, according to an embodiment.

FIG. 3 depicts a multi-site environment 300 in which steps for I/O command observation, I/O command logging, and I/O command mapping are combined to generate an I/O map that is used when forming a snapshot in response to a disaster recovery request. As an option, one or more variations of multi-site environment 300 or any aspect thereof may be implemented in the context of the architecture and functionality of the embodiments described herein.

As shown, primary site 102 includes one or more computing nodes, such as the shown "Node P1". Also, and as shown, secondary site 104 includes one or more computing nodes, such as the shown "Node S1". The primary site includes a process that generates I/O activity over sets of computing entities that have been drawn into one or more groups (step 302). As shown, "Group G1" comprises several virtual disks, namely "vDiskA", "vDiskB", "vDiskC", and "Group GN" comprises several virtual disks, namely "vDiskP" and "vDiskQ". A group can comprise any combination of virtualized entities, including a vDisk or multiple vDisks, a virtual network interface card (vNIC) or multiple vNICs, a virtual machine configuration, etc.

Input/output activity over any of the computer entities in a group are streamed over from the primary site to the secondary site as a stream of I/O commands. More particularly, and as shown, while I/O commands are streamed from the primary site to the secondary site, the I/O commands are observed (e.g., using any known technique) and logged. For example, at some moment after time $T=T_1$, an I/O command "A1" as pertaining to vDiskA is observed, timestamped, and logged into an I/O playback repository (e.g., I/O log $306_P$). On an ongoing basis, as I/O commands are streaming, a group I/O mapping process maintains an I/O map $209_1$.

In the specific embodiment of FIG. 3, the group I/O mapping process is performed by a group I/O mapper 310, which includes a processing capability (e.g., process 311) whereby a log-referring group I/O map is maintained as I/O commands are observed and logged. The I/O map is persisted periodically to the secondary site. More particularly, a node (e.g., Node S1) at the secondary site can receive I/O commands (process 304) and store them in an I/O playback repository (e.g., secondary I/O log $306_S$). Also, a node at the secondary site can receive updates to the I/O map (process 308) and store such updated I/O mapping information in a persistent location, such as in the shown copy of I/O map $209_2$.

While I/O commands are being streamed to a secondary site, the I/O map is continuously being constructed. At various moments in time (e.g., the shown $T_1$, $T_2$, $T_3$), an entry is made into the I/O map. For example, see the depiction of group G1 I/O map $309_0$. More specifically, and as shown, an entry into the I/O map comprises a time indication (e.g., the shown "Snapshot Time"), and a last I/O indication (e.g., the shown "Identification of Last Group I/Os").

In this example, the last group I/Os pertaining to group G1 at the moment of time $T=T_2$ are "$A_1$" and "$C_{10}$". Also in this example, the last group I/Os pertaining to group G1 at the moment of time $T=T_3$ are "$A_4$", "$B_2$", and "$C_{12}$". The I/O map is continuously updated with whatever is the then-current last logged I/O command for an entity of a particular group.

There are many ways to form and continuously maintain an I/O map. One technique is shown and discussed as pertains to the following FIG. 4.

Figure 4:
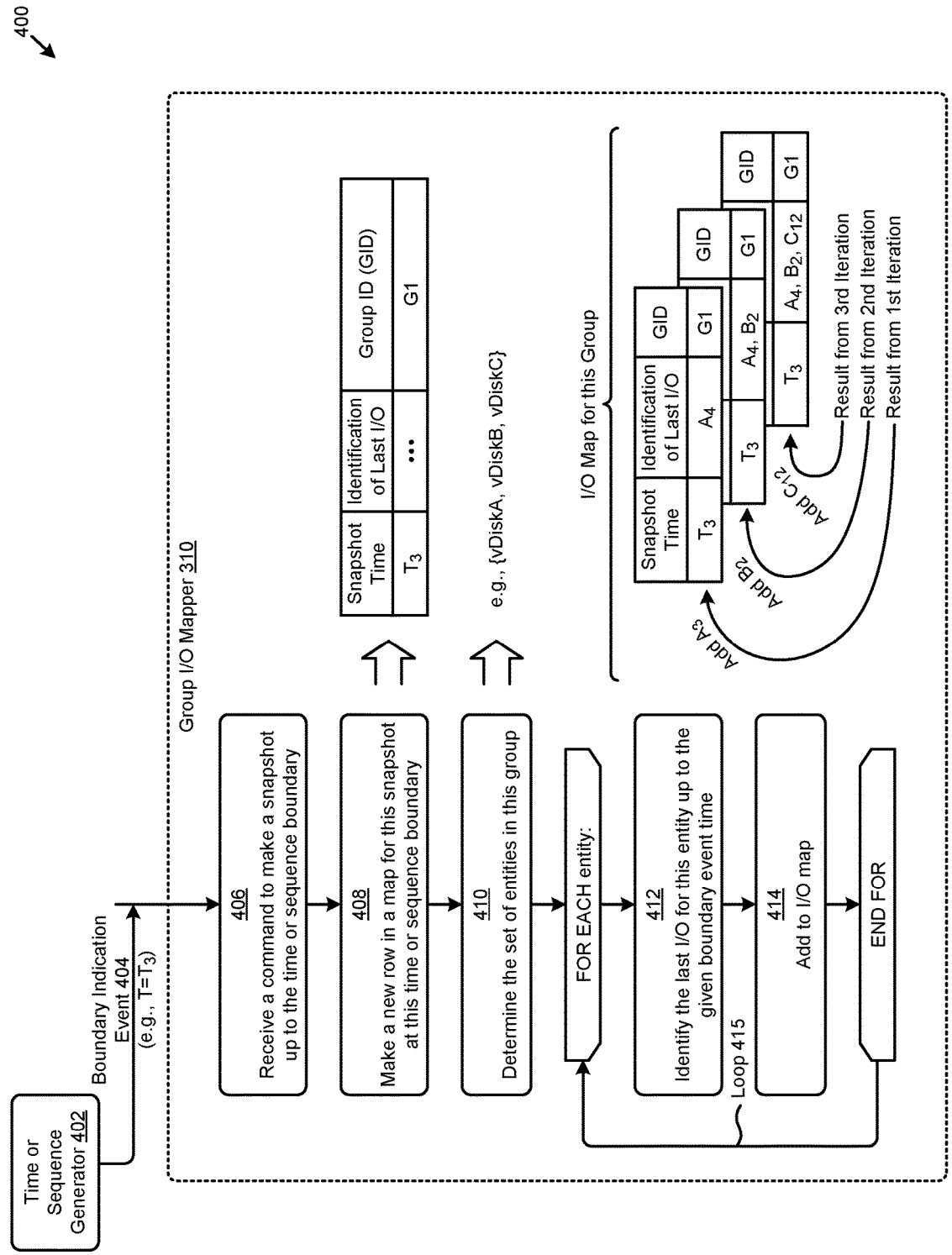
FIG. 4 presents a group I/O map maintenance technique for mapping streaming I/O commands into a group for later formation of a snapshot for the group, according to an embodiment.

FIG. 4 presents a group I/O map maintenance technique 400 for mapping streaming I/O commands into a group for later formation of a snapshot for the group. As an option, one or more variations of group I/O map maintenance technique 400 or any aspect thereof may be implemented in the context of the architecture and functionality of the embodiments described herein. The group I/O map maintenance technique 400 or any aspect thereof may be implemented in any environment.

The embodiment shown in FIG. 4 includes merely one example implementation of group I/O mapper 310. As shown, the group I/O mapper 310 is invoked by an occurrence of a boundary indication event 404. A boundary indication event might occur as a result of the passage of time to a next time unit (e.g., from an earlier time to time $T=T_3$), or a boundary indication event might be a progression through to a particular sequence number. In either of the foregoing cases, the boundary indication can be defined as a number that corresponds to a time progression or a sequence progression.

Accordingly, example embodiments include a time or sequence generator 402. The time or sequence generator can issue an instruction to the group I/O mapper, which instruction might be provided together with, or referred to by a boundary indication event 404. Step 406 interprets such a command in a manner to permit formation of an entry into the I/O map. More specifically, in the depicted embodiment, step 406 serves to make a new row in an I/O map. The I/O map might be a table or other mapping data structure that is specific to a particular group, such as is shown in FIG. 3, or the I/O map might be an I/O map that is organized as a table or other mapping data structure that includes a column or label or other indication of the pertinence of a row to a group such as is shown in FIG. 4.

In the example shown in FIG. 4, the boundary indication received corresponds to time $T=T_3$. As such, when step 408 makes the new row, it includes a time or sequence indication, such as is shown in the column labeled "Snapshot Time". In this specific example, the time indication is $T=T_3$, and the group ID is "G1". Next, at step 410, a group definition data structure is accessed to determine the set of entities that are associated with the group "G1". In this example, group "G1" comprises vDiskA, vDiskB, and vDiskC.

For each entity of the group, loop 415 is entered. Loop 415 iterates through each entity or group, identifying the last I/O command for the entity up until the specified boundary time or sequence is identified (step 412) and stored in a row (step 414). In this example, there are three entities in the group, thus, there are three iterations through loop 415. In each iteration, a different entity is handled, and the last I/O command for the entity up until the specified boundary time indication is identified and stored in a row. This is depicted in the diagram where the three iterations (e.g., result from 1st iteration, result from 2nd iteration, result from 3rd iteration) correspond to "Add $A_4$", "Add $B_2$", and "Add $C_{12}$", respectively.

As can be seen, when a row has been completed and the last I/O command, up until the specified time or sequence for each entity of the group has been entered into the I/O map for this group, the I/O map can then be used to replay entity-specific I/O commands up through the last I/O command up until the specified time or sequence. As such, a snapshot can be generated on command. Snapshot generation is accomplished by identifying some previous backup data, then replaying I/O commands from the secondary site I/O log 207 through to the last I/O command up until the specified time or sequence for this group.

The specific identification of a last I/O command can vary from implementation to implementation. In this example, the identification is given by pairing an entity identifier or abbreviation (e.g., "A", "B", "C", etc.) and a relative sequence number (e.g., 1, 2, 3, etc.). The specific identification of a given I/O command can be used to look up the entire contents of the logged I/O command. An example log is shown and described as pertains to FIG. 5.

Figure 5:
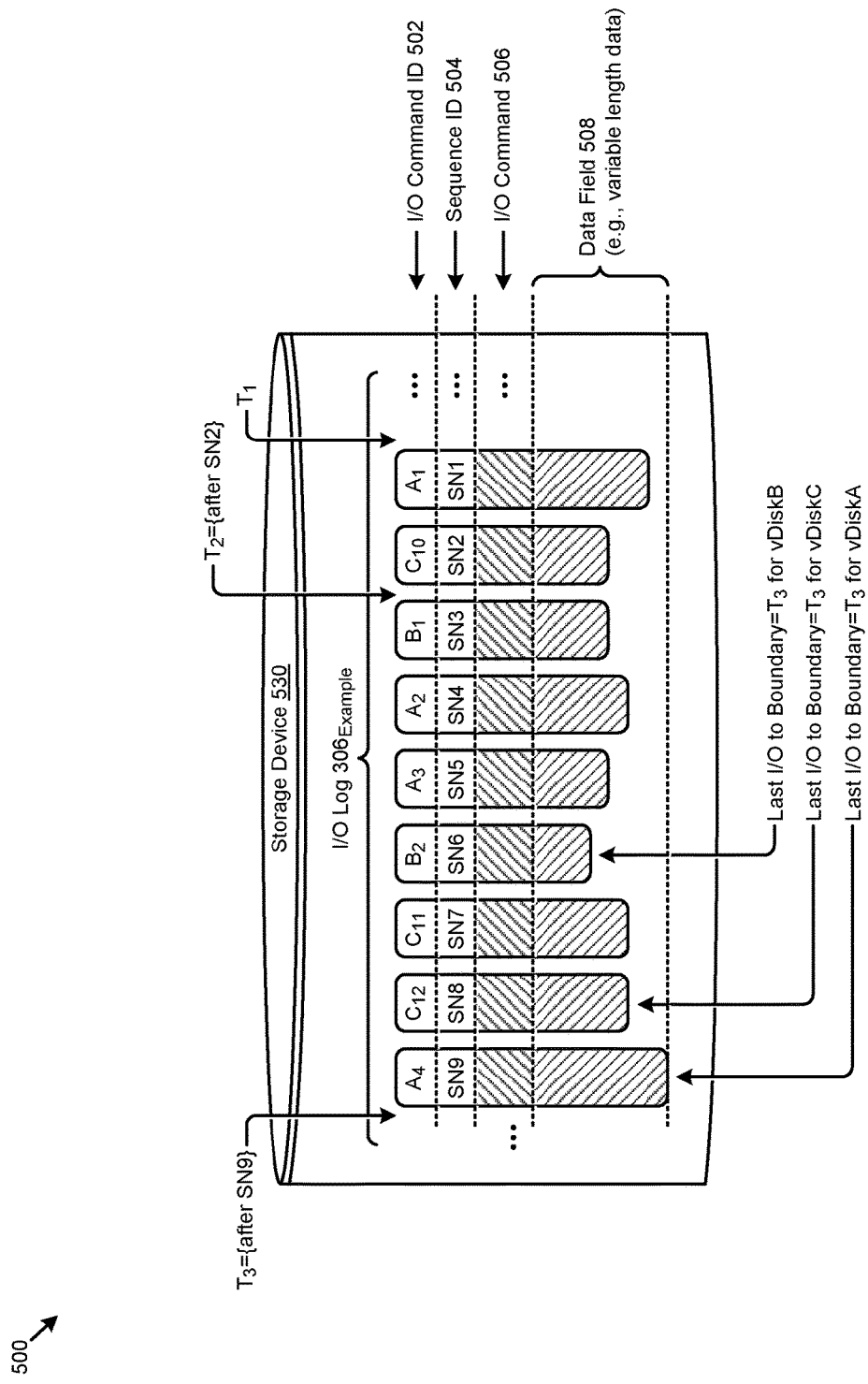
FIG. 5 depicts an example I/O log showing I/O commands for a particular entity group as used for formation of a snapshot from the I/O commands, according to some embodiments.

FIG. 5 depicts an example I/O log 500 showing I/O commands for a particular entity group as used for formation of a snapshot from the I/O commands. As an option, one or more variations of I/O log 500 or any aspect thereof may be implemented in the context of the architecture and functionality of the embodiments described herein. The I/O log 500 or any aspect thereof may be implemented in any environment.

The shown embodiment includes storage into a persistent storage device (e.g., storage device 530). The storage area is large enough to retain I/O commands over a long enough period of time so as to cover whatever snapshotting periods might be needed to observe a restore point objective. In this example, however, the shown storage area is merely large enough for illustration of this example. Specifically, the shown storage area of I/O log $306_{Example}$ holds nine I/O commands through time $T=T_3$, namely the I/Os identified as $A_1$, $C_{10}$, $B_1$, $A_2$, $A_3$, $B_2$, $C_{11}$, $C_{12}$ and $A_4$. In addition to I/O command ID 502, each I/O command entry also comprises a sequence ID 504 as well as the entire I/O command 506, including any data of the command. The data field 508 is of variable length. Strictly as an example, I/O command $A_1$ might be a command to "store these 5 blocks into vDiskA beginning at vDisk logical block ID=5005". As another example, I/O command $C_{10}$ might be a command to "store these 7 blocks into vDiskC beginning at vDisk logical block ID=6006".

When replaying I/O commands to form a restore set (e.g., after receiving a disaster recovery request), a replay process identifies some previous backup data, then replays I/O commands from the I/O log through to the last I/O command up until the specified time or sequence (such as time $T=T_3$). For example, and using $T=T_3$ as the time boundary, when replaying from the I/O log $306_{Example}$, I/O commands "$A_1$", "$A_2$", "$A_3$" and "$A_4$" (e.g., those I/O commands pertaining to vDiskA up until the last I/O within the specified time or sequence boundary) are replayed over some previous backup set. Continuing this example, when replaying from the I/O log $306_{Example}$, I/O commands "$B_1$" and "$B_2$" (e.g., those I/O commands pertaining to vDiskB up until the last I/O within the specified time or sequence boundary) are replayed over the previous backup set. When replaying from the I/O log $306_{Example}$, I/O commands "$C_{10}$", "$C_{11}$" and "$C_{12}$" (e.g., those I/O commands pertaining to vDiskC up until the last I/O specified within the time or sequence boundary) are replayed over the previous backup set. As such, the state of the computing entities of the group are available as a restore set, which can then be sent to the primary site for restoration.

Figure 6:
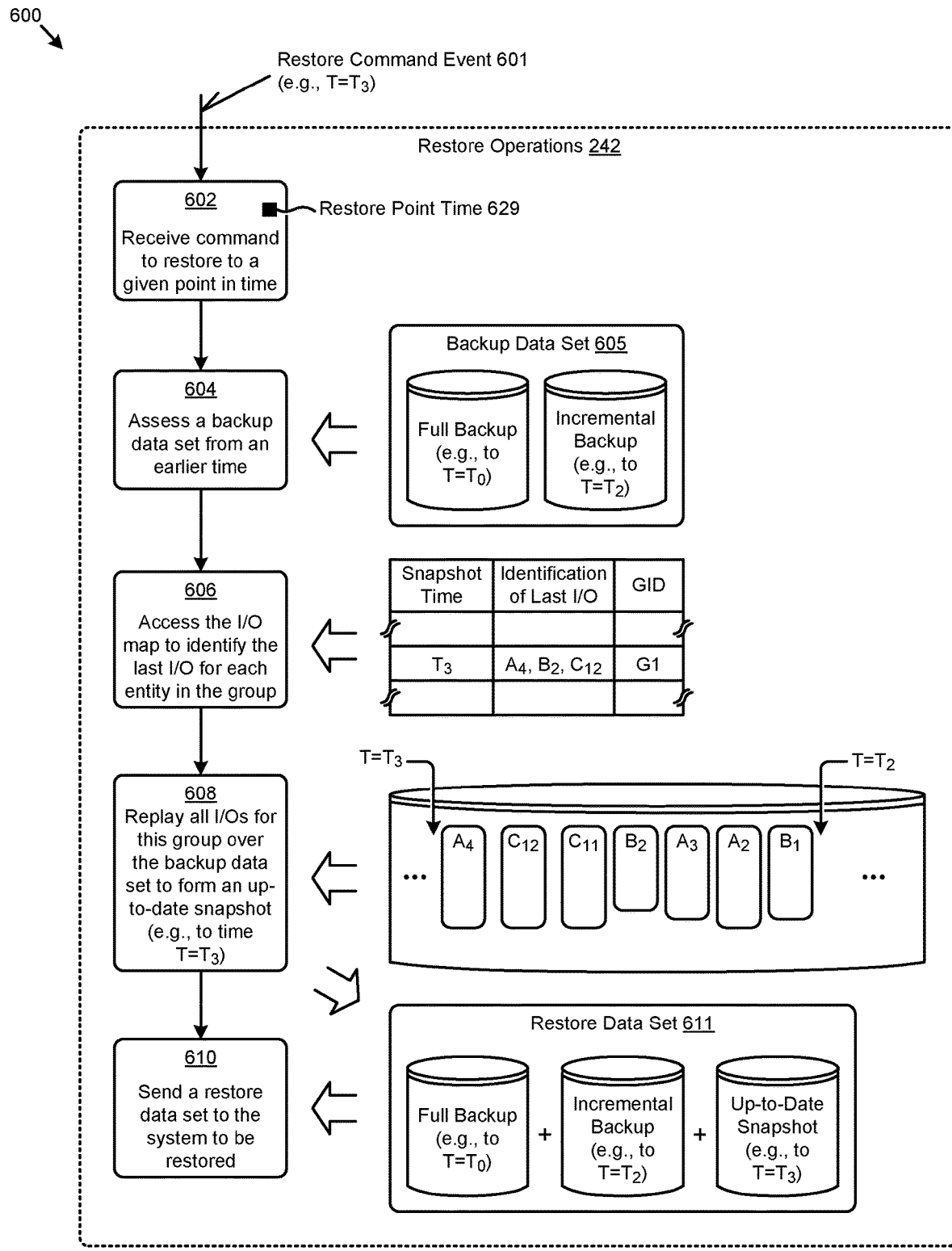
FIG. 6 depicts a restore set generation technique that uses an I/O map and an I/O log to replay I/O commands of a group to form an up-to-date snapshot for the group, according to some embodiments.

FIG. 6 depicts a restore set generation technique 600 that uses an I/O map and an I/O log to replay I/O commands of a group to form an up-to-date snapshot for that group. As an option, one or more variations of restore set generation technique 600 or any aspect thereof may be implemented in the context of the architecture and functionality of the embodiments described herein. The restore set generation technique 600 or any aspect thereof may be implemented in any environment.

The example restore operations 242 of FIG. 6 commence at step 602 upon receipt of a restore command event 601. A restore command might be included in a disaster recovery request and/or a restore command might be issued by a restore process or agent. As shown, the restore command event 601 includes a time (e.g., $T=T_3$) that requests restoration up to that point in time, such as is given by the shown restore point time 629. At step 604, an applicable backup data set 605 is accessed. The backup data set is used as a base set over which to replay I/O commands. In some cases, a backup data set might comprise a "Full Backup" (e.g., a full backup of data from a day ago or a few days ago) and an "Incremental Backup" (e.g., an incremental backup of data from an hour ago or a few hours ago).

When the applicable backup data set has been identified, then step 606 is entered. The operation of step 606 accesses the I/O map to identify the last I/O for each entity in the group. Step 608 replays the I/O commands from the point of the last time or sequence given in the backup set through to the last I/O identified by operations of step 606. This step 608 thus generates the restore data set 611, which is then made available to send to the primary site (or alternate site) for restoration (step 610).

Additional Embodiments of the Disclosure

Additional Practical Application Examples

Figure 7:
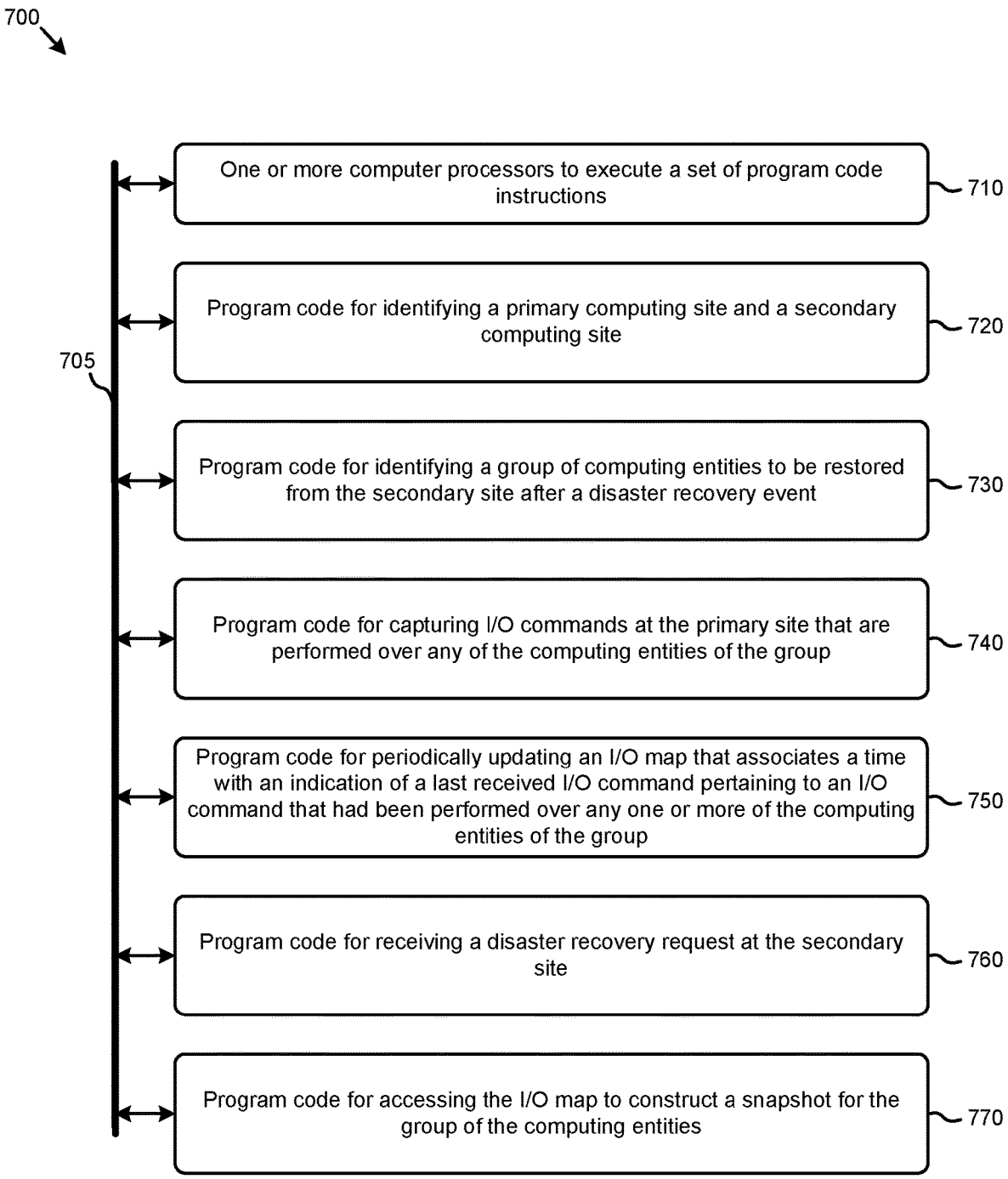
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address restoring data up to the most recent I/O commands without performing high-frequency snapshots. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising one or more computer processors to execute a set of program code instructions (module 710) and modules for accessing memory to hold program code instructions to perform: identifying a primary computing site and a secondary computing site (module 720); identifying a group of computing entities to be restored from the secondary computing site after a recovery request (e.g., after a disaster recovery event) (module 730); capturing I/O commands at the primary computing site that are performed over any of the computing entities of the group (module 740); periodically updating an I/O map that associates a time with an indication of a last received I/O command pertaining to an I/O command that had been performed over any one or more of the computing entities of the group (module 750); receiving a disaster recovery request at the secondary computing site (module 760); and accessing the I/O map to construct a snapshot for the group of the computing entities (module 770).

Variations of the foregoing may include more or fewer of the shown modules. Certain variations may perform more or fewer (or different) steps and/or certain variations may use data elements in more or in fewer (or different) operations. Still further, some embodiments include variations in the operations performed, and some embodiments include variations of aspects of the data elements used in the operations.

System Architecture Overview

Additional System Architecture Examples

Figure 8A:
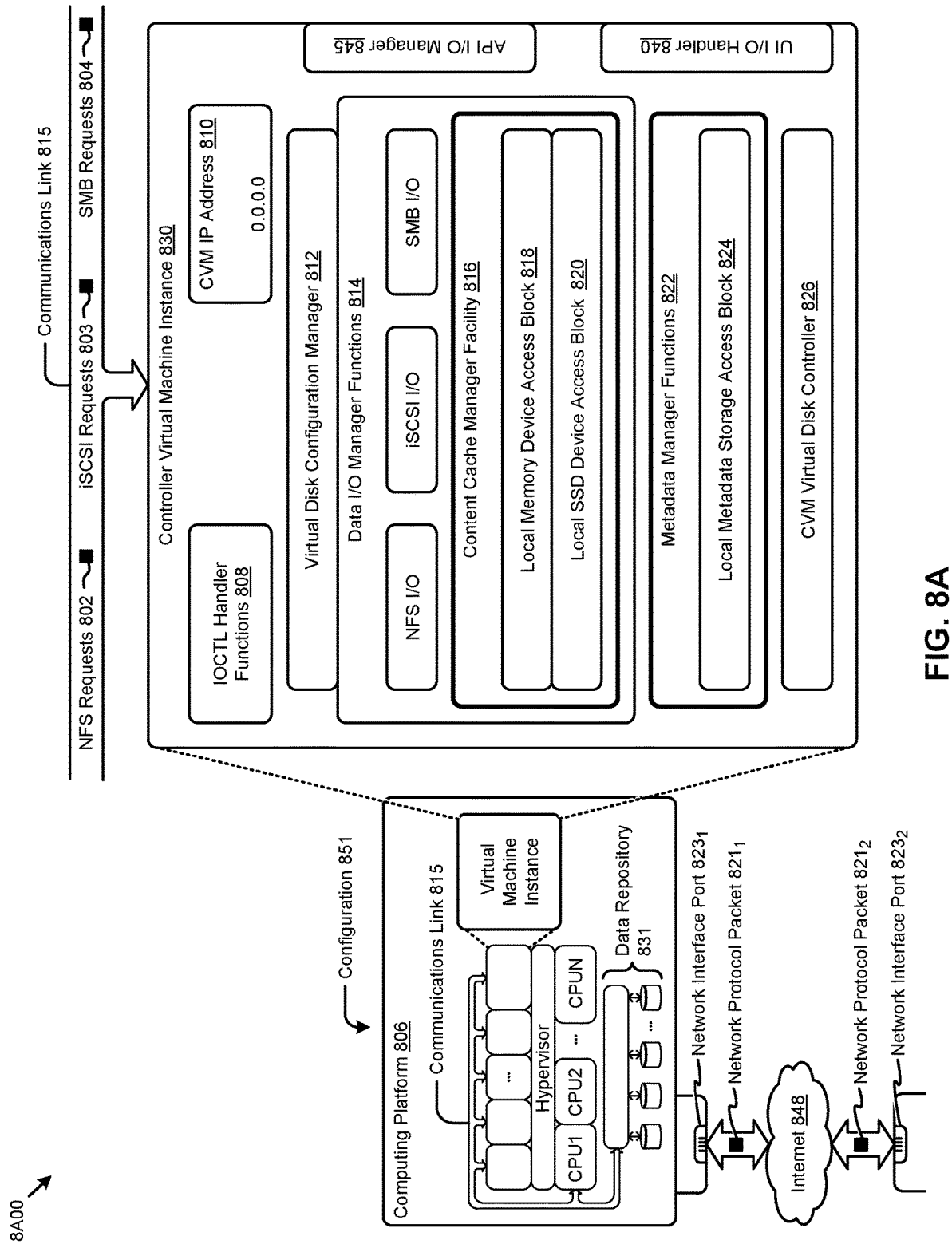
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective, such as to provide high performance computing, high performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). External data repository 831 can store any forms of data, and may comprise a storage area dedicated to storage of metadata pertaining to the stored forms of data. In some cases, metadata can be divided into portions. Such portions and/or cache copies can be stored in the external storage data repository and/or in a local storage area (e.g., in local DRAM areas and/or in local SSD areas). Such local storage can be accessed using functions provided by local metadata storage access block 824. External data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure. The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or the results of executing program code can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to streaming I/O commands to a remote site for later formation of an application-consistent restore point. In some embodiments, a module may include one or more state machines and/or combinational logic used to implement or facilitate the operational and/or performance characteristics pertaining to streaming I/O commands to a remote site for later formation of an application-consistent restore point.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of streaming I/O commands to a remote site for later formation of an application-consistent restore point). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to streaming I/O commands to a remote site for later formation of an application-consistent restore point, and/or for improving the way data is manipulated when performing computerized operations pertaining to maintaining an I/O log and an I/O map for I/O replay.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
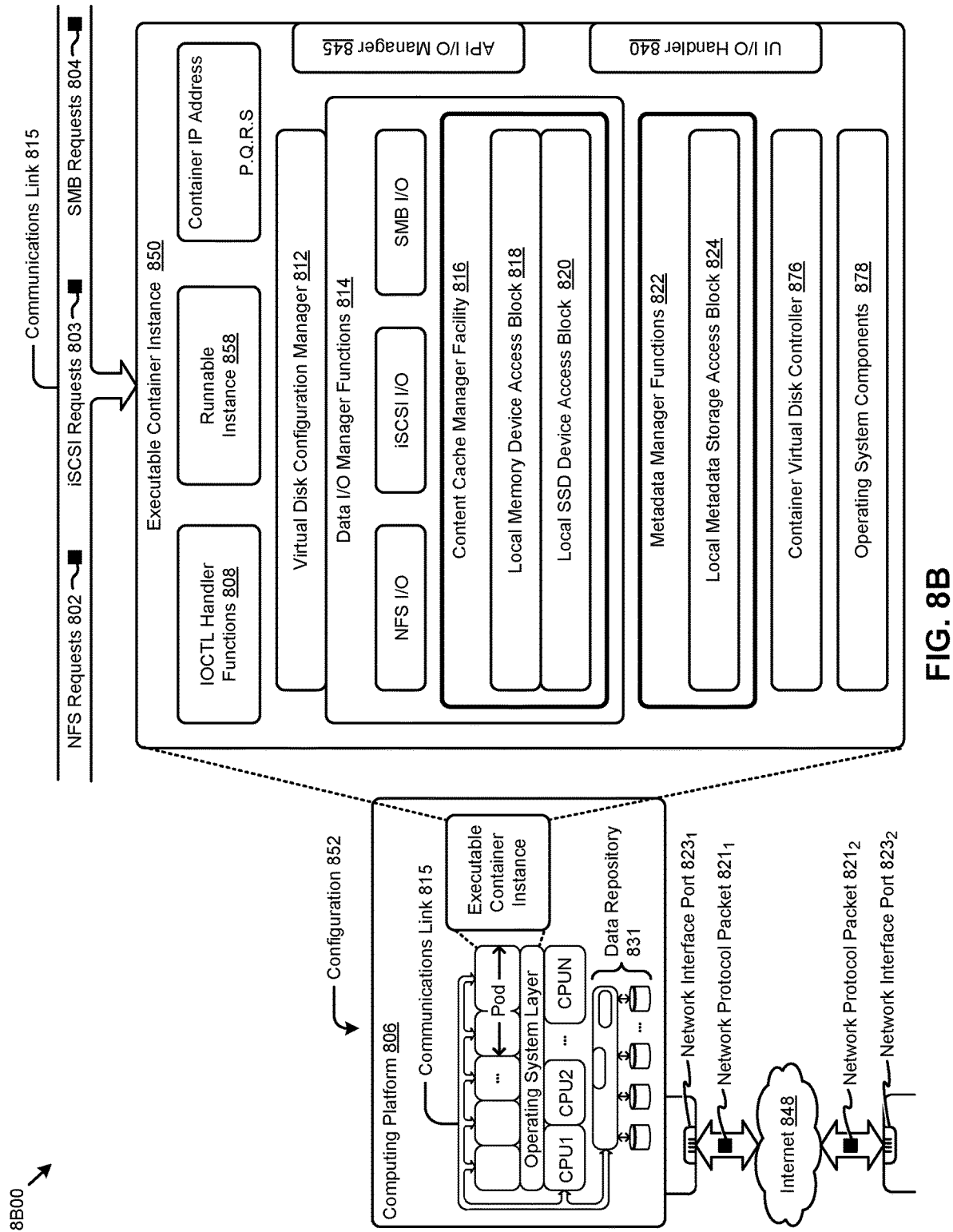

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container. Any executable container of any sort can be rooted in a directory system, and can be configured to be accessed by file system commands (e.g., "ls" or "ls–a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
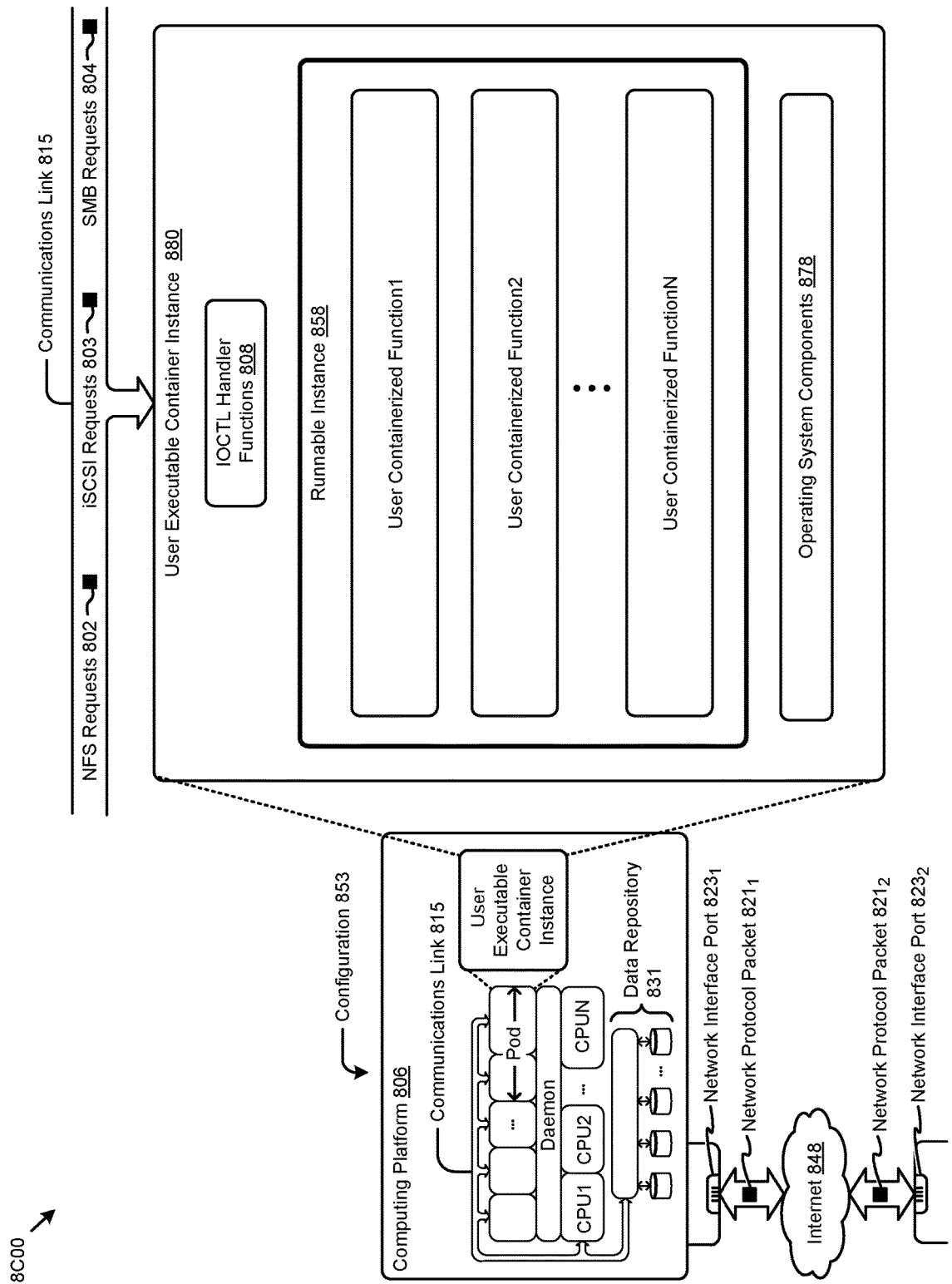

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown instance of the daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously, or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown external data repository 831 and/or any forms of network accessible storage. As such, the multiple tiers of storage may include storage that is accessible over communications link 815. Such network accessible storage may include cloud storage or networked storage (e.g., a SAN or "storage area network"). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices, such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine (CVM) is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when executed by a processor causes a set of acts for emulating high-frequency application-consistent snapshotting, the set of acts comprising:

registering a first group of computing entities for a first application and a second group of computing entities for a second application;

transmitting, from a first computing site to a second computing site, a stream of I/O commands performed over any computing entity from the first group of computing entities and the second group of computing entities;

maintaining an I/O map that associates a first identifier for the first group of computing entities with first corresponding individual I/O commands of the stream of I/O commands and that associates a second identifier for the second group of computing entities with second corresponding individual I/O commands of the stream of I/O commands; and transmitting a signal to the second computing site to invoke replaying of at least some of the first corresponding individual I/O commands of the stream of I/O commands to construct an application-consistent snapshot for the first group of computing entities, wherein the at least some of the first corresponding individual I/O commands correspond to the first identifier of the first group of computing entities in the I/O map and the application-consistent snapshot is constructed at the second computing site.

2. The computer readable medium of claim 1, wherein a guest agent identifies an event that changes at least one aspect of the first group of computing entities.

3. The computer readable medium of claim 1, wherein a guest agent configures a frequency to monitor the first group of computing entities for the first application.

4. The computer readable medium of claim 1, wherein the set of acts further comprise responding to an event that changes at least one aspect of the first group of computing entities of the first application by registering an updated group of computing entities.

5. The computer readable medium of claim 1, wherein the signal to the second computing site to invoke replaying of the at least some of the first corresponding individual I/O commands of the stream of I/O commands to construct the application-consistent snapshot for the first group of computing entities specifies a point in time for use in constructing the application-consistent snapshot at the second computing site.

6. The computer readable medium of claim 1, wherein the set of acts further comprise transmitting a recovery point specification to the second computing site before transmitting the signal to the second computing site to invoke replaying of the at least some of the first corresponding individual I/O commands of the stream of I/O commands to construct the application-consistent snapshot for the first group of computing entities.

7. The computer readable medium of claim 1, wherein the set of acts further comprise monitoring for changes to the second group of computing entities.

8. The computer readable medium of claim 1, wherein respective I/Os of the first corresponding individual I/O commands correspond to an I/O command ID and a sequence ID.

9. A method for emulating high-frequency application-consistent snapshotting, the method comprising:
registering a first group of computing entities for a first application and a second group of computing entities for a second application;
transmitting, from a first computing site to a second computing site, a stream of I/O commands performed over any computing entity from the first group of computing entities and the second group of computing entities;
maintaining an I/O map that associates a first identifier for the first group of computing entities with first corresponding individual I/O commands of the stream of I/O commands and that associates a second identifier for the second group of computing entities with second corresponding individual I/O commands of the stream of I/O commands; and
transmitting a signal to the second computing site to invoke replaying of at least some of the first corresponding individual I/O commands of the stream of I/O commands to construct an application-consistent snapshot for the first group of computing entities, wherein the at least some of the first corresponding individual I/O commands correspond to the first identifier of the first group of computing entities in the I/O map and the application-consistent snapshot is constructed at the second computing site.

10. The method of claim 9, wherein a guest agent identifies an event that changes at least one aspect of the first group of computing entities.

11. The method of claim 9, wherein a guest agent configures a frequency to monitor the first group of computing entities for the first application.

12. The method of claim 9, further comprising responding to an event that changes at least one aspect of the first group of computing entities of the first application by registering an updated group of computing entities.

13. The method of claim 9, wherein the signal to the second computing site to invoke replaying of the at least some of the first corresponding individual I/O commands of the stream of I/O commands to construct the application-consistent snapshot for the first group of computing entities specifies a point in time for use in constructing the application-consistent snapshot at the second computing site.

14. The method of claim 9, further comprising transmitting a recovery point specification to the second computing site before transmitting the signal to the second computing site to invoke replaying of the at least some of the first corresponding individual I/O commands of the stream of I/O commands to construct the application-consistent snapshot for the first group of computing entities.

15. The method of claim 9, further comprising monitoring for changes to the second group of computing entities.

16. The method of claim 9, wherein respective I/Os of the first corresponding individual I/O commands correspond to an I/O command ID and a sequence ID.

17. A system for emulating high-frequency application-consistent snapshotting, the system comprising:
a storage medium having stored thereon a set of instructions; and
a processor that executes the set of instructions to cause the processor to perform a set of acts comprising:
registering a first group of computing entities for a first application and a second group of computing entities for a second application;
transmitting, from a first computing site to a second computing site, a stream of I/O commands performed over any computing entity from the first group of computing entities and the second group of computing entities;
maintaining an I/O map that associates a first identifier for the first group of computing entities with first corresponding individual I/O commands of the stream of I/O commands and that associates a second identifier for the second group of computing entities with second corresponding individual I/O commands of the stream of I/O commands; and
transmitting a signal to the second computing site to invoke replaying of at least some of the first corresponding individual I/O commands of the stream of I/O commands to construct an application-consistent snapshot for the first group of computing entities, wherein the at least some of the first corresponding individual I/O commands correspond to the first identifier of the first group of computing entities in the I/O map and the application-consistent snapshot is constructed at the second computing site.

18. The system of claim 17, wherein a guest agent identifies an event that changes at least one aspect of the first group of computing entities.

19. The system of claim 17, wherein a guest agent configures a frequency to monitor the first group of computing entities for the first application.

20. The system of claim 17, wherein the set of acts further comprise responding to an event that changes at least one aspect of the first group of computing entities of the first application by registering an updated group of computing entities.

21. The system of claim 17, wherein the signal to the second computing site to invoke replaying of the at least some of the first corresponding individual I/O commands of the stream of I/O commands to construct the application-consistent snapshot for the first group of computing entities specifies a point in time for use in constructing the application-consistent snapshot at the second computing site.

22. The system of claim 17, wherein the set of acts further comprise transmitting a recovery point specification to the second computing site before transmitting the signal to the second computing site to invoke replaying of the at least some of the first corresponding individual I/O commands of the stream of I/O commands to construct the application-consistent snapshot for the first group of computing entities.

23. The system of claim 17, wherein the set of acts further comprise monitoring for changes to the second group of computing entities.

24. The system of claim 17, wherein respective I/Os of the first corresponding individual I/O commands correspond to an I/O command ID and a sequence ID.

* * * * *